(12) United States Patent
Van Rest et al.

(10) Patent No.: US 10,810,257 B2
(45) Date of Patent: Oct. 20, 2020

(54) FAST PROCESSING OF PATH-FINDING QUERIES IN LARGE GRAPH DATABASES

(71) Applicant: Oracle International Corporation, Redwood Shores, CA (US)

(72) Inventors: Oskar Van Rest, Mountain View, CA (US); Jinha Kim, Sunnyvale, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 426 days.

(21) Appl. No.: 14/837,696

(22) Filed: Aug. 27, 2015

(65) Prior Publication Data

US 2017/0060958 A1  Mar. 2, 2017

(51) Int. Cl.
*G06F 16/901* (2019.01)

(52) U.S. Cl.
CPC ................ *G06F 16/9024* (2019.01)

(58) Field of Classification Search
CPC ......... G06F 17/30958; G06F 17/30864; G06F 17/30867; G06F 17/30545; G06F 17/3087
USPC ........................................................ 707/770
See application file for complete search history.

(56) References Cited

U.S. PATENT DOCUMENTS

| | | |
|---|---|---|
| 6,883,161 B1 | 4/2005 | Chovin et al. |
| 7,366,842 B1 | 4/2008 | Accoclla |
| 7,478,375 B1 | 1/2009 | Kersters |
| 8,910,134 B2 | 12/2014 | Hong et al. |
| 8,949,811 B2 | 2/2015 | Murthy |
| 2004/0194074 A1 | 9/2004 | Shibayama |
| 2005/0278451 A1 | 12/2005 | Yamashita |
| 2006/0195463 A1 | 8/2006 | Bogner |
| 2010/0262574 A1* | 10/2010 | Zhou .................. G06N 5/02 706/50 |
| 2011/0055511 A1 | 3/2011 | Mantor |
| 2011/0099541 A1 | 4/2011 | Blomstedt |
| 2011/0138369 A1 | 6/2011 | Chandra |

(Continued)

OTHER PUBLICATIONS

Then U.S. Appl. No. 14/710,117, filed May 15, 2015, Office Action, dated Oct. 11, 2017.

(Continued)

*Primary Examiner* — Syed H Hasan
*Assistant Examiner* — Nicholas E Allen
(74) *Attorney, Agent, or Firm* — Hickman Palermo Becker Bingham LLP

(57) ABSTRACT

Techniques herein are for fast processing of path-finding queries in large graph databases. A computer system receives a graph search request to find a set of result paths between one or more source vertices of a graph and one or more target vertices of the graph. The graph comprises vertices connected by edges. During a first pass, the computer system performs one or more breadth-first searches to identify a subset of edges of the graph. The one or more breadth-first searches originate at the one or more source vertices. After the first pass and during a second pass, the computer system performs one or more depth-first searches to identify the set of result paths. The one or more depth-first searches originate at the one or more target vertices. The one or more depth-first searches traverse at most the subset of edges of the graph.

44 Claims, 9 Drawing Sheets

(56) References Cited

U.S. PATENT DOCUMENTS

| | | | |
|---|---|---|---|
| 2011/0173189 A1* | 7/2011 | Singh | G06F 16/9024 707/722 |
| 2011/0276962 A1 | 11/2011 | Chambers | |
| 2013/0086354 A1 | 4/2013 | Satish | |
| 2013/0097136 A1 | 4/2013 | Goldberg | |
| 2013/0139135 A1 | 5/2013 | Ditu | |
| 2014/0019949 A1 | 1/2014 | Craymer | |
| 2014/0122812 A1 | 5/2014 | Hakura | |
| 2014/0137130 A1* | 5/2014 | Jacob | G06F 9/46 718/103 |
| 2014/0172914 A1* | 6/2014 | Elnikety | G06F 16/9024 707/774 |
| 2014/0189665 A1 | 7/2014 | Hong et al. | |
| 2014/0244687 A1* | 8/2014 | Shmueli | G06F 17/30587 707/780 |
| 2014/0306964 A1 | 10/2014 | Reddish | |
| 2014/0310619 A1 | 10/2014 | Fickenwirth | |
| 2014/0351820 A1 | 11/2014 | Lee | |
| 2015/0006316 A1* | 1/2015 | Zhou | G06Q 10/04 705/26.7 |
| 2015/0007154 A1 | 1/2015 | Bharadwaj | |
| 2015/0040110 A1 | 2/2015 | Adl-Tabatabai | |
| 2015/0095698 A1 | 4/2015 | Ema | |
| 2015/0112986 A1* | 4/2015 | Jin | G06F 16/9024 707/736 |
| 2015/0128151 A1 | 5/2015 | Rak | |
| 2015/0178405 A1 | 6/2015 | Hong et al. | |
| 2015/0331683 A1 | 11/2015 | Sevenich et al. | |
| 2015/0350324 A1 | 12/2015 | Hu et al. | |
| 2015/0355891 A1 | 12/2015 | Angerer | |
| 2016/0019228 A1 | 1/2016 | Hong | |
| 2016/0048607 A1 | 2/2016 | Raman | |
| 2016/0062776 A1 | 3/2016 | Stanfill | |
| 2016/0117358 A1 | 4/2016 | Schmid | |
| 2016/0335322 A1 | 11/2016 | Then et al. | |
| 2016/0364220 A1 | 12/2016 | Arai | |
| 2017/0024192 A1 | 1/2017 | Hong et al. | |
| 2017/0168779 A1 | 6/2017 | Sevenich | |

OTHER PUBLICATIONS

Yuechao, et al., "Multi-GPU Graph Analytics", dated Apr. 19, 2015, 12 pages.

Yanagisawa, "A Multi-Source Label-Correcting Algorithm for the All Pairs Shorest Paths Problem", dated 2010, IEEE, pp. 1-10.

Then et al., "The More the Merrier: Efficient Multi-Source Graph Traversal", Proceedings of the VLDB Endowment, vol. 8 Issue 4, Dec. 2014, 12 pages.

Sevenich et al., "Using Domain-Specific Languages for Analytic Grpah Database", VLDB Endowment, dated Sep. 2016, pp. 1257-1268

Schiller et al., "Efficient Data Structures for Dynamic Graph Analysis", IEEE, dated Nov. 2015, pp. 497-504.

Perez et al., "Ringo: Interactive Graph Analytics on Big-Memory Machines", ACM, SIGMOD, dated May 2015, 6 pages.

Madduri, Kamesh, "Scaling up graph algorithms on emerging multicore systems", Berkeley Lab, 22 pages.

Lopez, Karen, "Your Master Data Is a Graph: Are You Ready?", Oracle, dated Mar. 2015, 14 pages.

Liu et al., "iBFS: Concurrent Breadth-First Search on GPUs", SIGMOD'16, Jun. 26-Jul. 1, 2016, San Francisco, CA, USA, 14 pages.

Hong et al., "Simplifying Scalable Graph Processing with a Domain-Specific Language", ADM, CGO'14, pp. 208-218.

Hong et al., "Early Experiences in Using a Domain-Specific Language for Large-Scale Graph Analysis", ACM, Grades, dated 2013, pp. 1-6.

Hong et al. "Green-Marl: A DSL for Easy and Efficeient Graph Analysis", ASPLOS' dated Mar. 2012, 14 pages.

Banerjee et al., "Towards Logical Level Design of Big Data", dated Jul. 2015, 7 pages.

Bak et al., "A Reference Interpreter for the Graph Programming Language GP 2", Proc. Graphs as Models (GaM 2015), vol. 181, dated Apr. 2015, 17 pages.

Ariful et al., "A Parallel Tree Grafting Algorithm for Maximum Cardinality Matching in Bipartite Graphs", dated May 25, 2015, 10 pages.

Then, U.S. Appl. No. 14/710,117, filed May 12, 2018, Final Office Action, dated May 16, 2018.

Then, U.S. Appl. No. 14/710,117, filed May 12, 2018, Notice of Allowance, dated Aug. 23, 2018.

Then, U.S. Appl. No. 14/710,117, filed May 12, 2015, Interview Summary, dated Jul. 18, 2018.

Tretyakov et al., "Fast Fully Dynamic Landmark-based Estimation of Shortest Path Distances in Very Large Graphs", CIKM dated Oct. 24-28 2011, 10 pages.

Sommer, Christian, Shortest-Path Queries in Static Networks, ACM Computing Surveys, vol. V No. N, dated Sep. 2013, 35 pages.

Queiros et al., "A New Shortest Paths Ranking Algorithm", dated Jul. 1999, 15 pages.

Potamias et al., "Fast Shortest Path Distance Estimation in Large Networks", dated Mar. 9, 2009, 13 pages.

Jimenez et al., "Computing the K Shortest Paths: A New Algorithm and Experimental Comparision", WAE dated 1999, 15 pages.

Jimenez et al., "A Lazy Version of Eppstein's K Shortest Paths Algorithm", dated 2003, 13 pages.

Grant et al., "LPI Approximating Shortest Paths Using Landmarks", dated 2008, 5 pages.

Goldberg et al., "Computing the Shortest Path: A Search Meets Graph Theory", dated Mar. 2004, 26 pages.

Fushs, Fabian, "On Preprocessing the ALT-Algorithm", dated Mar. 22, 2010, 48 pages.

Floreskul et al., "Memory-Efficient Fast Shortest Path Estimation in Large Social Networks", Eighth International AAAI Conference on Weblogs and Social Media, dated 2014, 10 pages.

Eppstein, David, "Finding the K Shortest Paths", Tech Report 94-26, dated May 31, 1994, 23 pages.

Shaffer, Clifford, "CS 5114: Theory of Algorithms", dated 2014, 9 pages.

Yildirim et al., "GRAIL: Scalable Reachability Index for Large Graphs", Proceedings of the VLDB Endowment, vol. 3, No. 1 Copyright 2010 VLDB Endowment 21508097, 9 pages.

* cited by examiner

FAST PROCESSING OF PATH-FINDING QUERIES IN LARGE GRAPH DATABASES

TECHNICAL FIELD

Embodiments relate generally to techniques for graph search. Specific techniques are included that use two passes in opposite directions to accelerate path finding.

BACKGROUND

In the database industry, graph databases are an emerging area that is growing quickly and drawing attention. A graph database is a special kind of database with an underlying dataset that is modeled as a graph.

Graph database products typically support path queries as an important feature for graph analytics to reveal connections between distant pieces of a graph. However, graph databases may have scalability problems that cause some path queries to slowly execute.

A path query is a special kind of query for graph databases. A path query may ask to find all possible paths between given source vertices and given target vertices. The result of the path query is a set of result paths. Each result path may have a sequence of vertices and edges.

For a while, the Oracle Spatial and Oracle Graph products have supported some graph data models which may benefit from path query acceleration. However, recent support for property graph data models increases the need for acceleration because of the richness of available edge and vertex subtypes.

As such, a path query may have semantic constraints on vertices, edges, or combinations of these. Only paths which meet the given constraints are included in the query result.

Path queries in existing graph databases have given rise to some observations. The graph data in graph databases can be voluminous and involve millions or billions of vertices and edges. Even small graphs may potentially have an exponential number of paths between two vertices.

In practice, typical queries include enough constraints to limit retrieved result paths to a small amount. Nevertheless, methodologies used in existing graph databases, such as bidirectional search, often need excessive execution time even when the amount of result paths is small.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer System
2.1 Graph Search
2.2 Breadth-First Searches During a First Pass
2.3 First Pass Pseudo-Code
2.4 Depth-First Searches During A Second Pass
2.5 Second Pass Pseudo-Code
3.0 Example Fast Process For Path-Finding Queries
4.0 Simple Cycle
5.0 Conjunct Paths
5.1 Search Request Decomposition
5.2 First Performance
5.3 Second Performance
5.4 Result Path Concatenation
6.0 Queries And Graph Databases
7.0 Parallelization
7.1 Parallel Breadth-First Search
7.2 Parallel Depth-First Search
8.0 Limiting Results
9.0 Archetypal Applications
9.1 Call Graph
9.2 Attack Graph
9.3 Pointer Graph
10.0 Hardware Overview
11.0 Extensions and Alternatives 1.0. General Overview Computerized techniques are described herein for fast processing of path-finding queries in large graph databases. These techniques search for paths in two passes of traversals through a graph of vertices. The vertices are interconnected by edges. The first pass narrows the scope of the search to a subset of edges in the graph. The second pass identifies result paths within the subset of edges. The result paths may satisfy constraints on edges or vertices.

In an embodiment, a computer system receives a graph search request to find a set of result paths between one or more source vertices of a graph and one or more target vertices of the graph. During a first pass, the computer system performs one or more breadth-first searches to identify a subset of edges of the graph. The breadth-first searches originate at the source vertices.

After the first pass and during a second pass, the computer system performs one or more depth-first searches to identify the set of result paths. The depth-first searches originate at the target vertices and process backwards to the source vertices. The depth-first searches traverse only the subset of edges that were identified in the first pass.

2.0 Example Computer System

Figure 1:
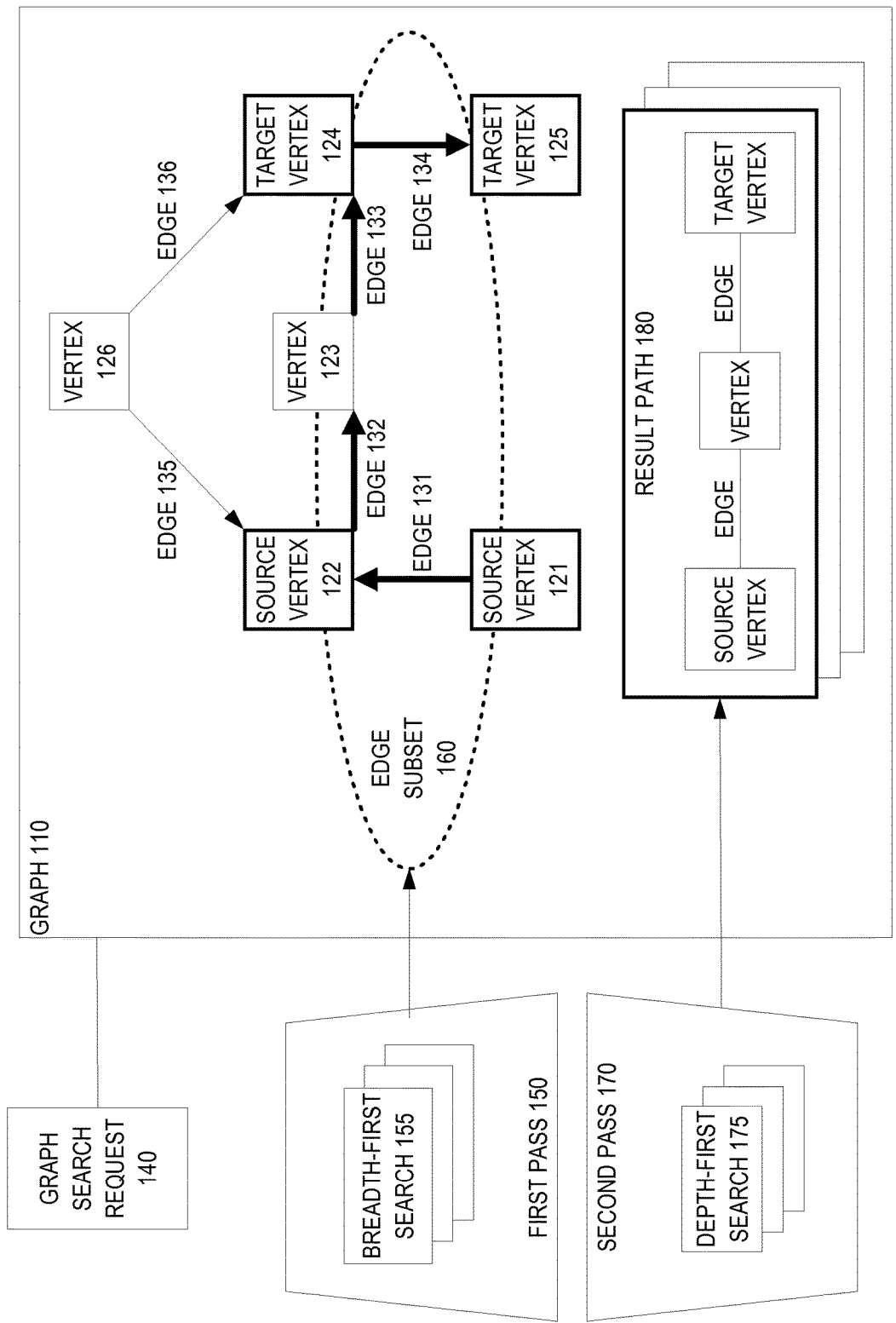
FIG. 1 is a logical block diagram illustrating an example computer system in which certain techniques described herein may be implemented, according to various embodiments.

FIG. 1 illustrates a block diagram of example computer system 100 for fast processing of path-finding queries, in which techniques described herein may be practiced. Computer system 100 may comprise a rack server such as a blade, a personal computer, a smartphone, a mainframe computer, any computer capable of processing logical graphs, or any connected aggregation of these.

Computer system 100 includes graph 110 that may have a multitude of vertices, such as 121-126, interconnected by edges, such as 131-136. Graph 110 may be cyclic or acyclic. Graph 110 may be directed or undirected. Graph 110 may be connected or disconnected. Edges 131-136 may be directed or undirected. However in this example, graph 110 and edges 131-136 are directed.

Graph 110 may include one or more data structures that occupy a memory, durable storage, a graph database, a relational database, or some combination of these. Vertices 121-126 may each represent an object such as a computer network element, a computer program object, a world wide web resource such as a webpage, or a person. Edges 131-136 may each represent an association such as a network link, a memory pointer, a hyperlink, or a friendship.

As such, graph 110 may be a social graph, a program object graph, an attack graph, a webgraph, or any other graph, network, or mesh. For example, the contents of any relational database or memory heap may be characterized as a graph.

A path is a sequence that enumerates vertices, edges, or both during a traversal of vertices and edges within graph 110. The path begins at a source vertex, such as 121-122, which may be any vertex in graph 110. The path ends at a target vertex, such as 124-125, which may be any vertex in graph 110, including any source vertex.

If an edge is directed, the path may only traverse the edge in one direction. Otherwise, the path may traverse the edge in either direction. A path includes a cycle if the traversal of the path visits a same vertex more than once. Whether a cycle is allowed in a path depends on the implementation. For example in some optimization applications, a cycle is always suboptimal and so is never considered.

2.1 Graph Search

In operation, computer system 100 may receive graph search request 140 to find a set of result paths 180 within graph 110. Graph search request 140 specifies one or more source vertices and one or more target vertices. In an embodiment, graph search request 140 may be a query such as a conjunctive context-free path query.

If graph search request 140 is otherwise unconstrained, then computer system 100 returns all possible result paths 180 that traverse from each of the source vertices to each of the target vertices. A result path 180 may specify a sequence of vertices, a sequence of edges, or as shown in FIG. 1, an alternating sequence of vertices and edges.

If graph search request 140 has additional constraints, then computer system 100 will limit result paths 180 to include only those that satisfy the constraints. For example, graph search request 140 may request any one result path, all shortest result paths, all result paths of a particular length, all result paths that pass thru a particular intermediate vertex, or all result paths that include only edges or vertices of a particular subtype.

Computer system 100 is configured to quickly determine result paths 180 according to techniques described herein. The more restrictive are the constraints of graph search request 140, the fewer result paths 180 are likely to match the request. Even without additional constraints, graph 110 might not have any result path 180 that satisfies graph search request 140 for a particular source vertex, for a particular target vertex, or for the entire request. The more vertices and edges that graph 110 has and the fewer result paths 180 that satisfy graph search request 140, then the greater may be the margin by which computer system 100 temporally outperforms other techniques.

In particular, the two-phased search technique of computer system 100 has a temporal complexity of $O(n+m \times p)$, where "n" is the amount of vertices in graph 110, "m" is the amount of edges in graph 110, and "p" is the combined length of all result paths 180. Whereas, some techniques have a temporal complexity of $O(2^m)$.

2.2 Breadth-First Searches During a First Pass

Computer system 100 processes graph search request 140 in two phases, which are first pass 150 and second pass 170. During each pass, at least the shortest of result paths 180 are actually traversed. First pass 150 traverses graph 110 in a direction that graph search request 140 specifies, which is from source vertices 121-122 to target vertices 124-125. In the absence of additional constraints, first pass 150 exhaustively visits all vertices of graph 110 that are reachable from source vertices 121-122. However, neither pass 150 nor 170 need traverse all edges of graph 110.

During first pass 150, computer system 100 performs separate breadth-first searches 155 that each originate at a respective source vertex 121-122. The goal of breadth-first searches 155 is to filter away those edges of graph 110 that cannot be part of any result path 180. Each breadth-first search 155 proceeds in iterations that incrementally extends a search radius around a source vertex.

Per a breadth-first search, the search radius defines an expanding horizon of unvisited vertices. At each iteration, only vertices that lie on the horizon are visited. After each iteration, the search radius is incremented by one, which expands the search horizon.

In a first iteration, the search radius is one, and breadth-first search 155 traverses edges that originate from a source vertex and reach a vertex that is a distance of one from the source vertex. For example if the source vertex is 121, then breadth-first search 155 traverses edge 131 to visit source vertex 122. Whereas if the source vertex is 122, then breadth-first search 155 traverses edge 132 to visit vertex 123. When traversing edges that leave source vertex 122, breadth-first search 155 cannot traverse edges 131 and 135, because these edges are oriented in the wrong direction.

When breadth-first search 155 traverses an edge, breadth-first search 155 marks the edge. Such marks are retained for the remainder of processing graph search request 140. Marking may be accomplished by each edge having a binary toggle, such as a bit or other Boolean. Alternatively, marking may occur by adding an edge to a set of marked edges.

Marks serve two purposes that are crucial for temporal efficiency. During first pass 150, a mark prevents repeated traversals of a same edge, either by a same breadth-first search 155 or by a breadth-first search 155 that originates from a different source vertex. During second pass 170, an unmarked edge cannot be part of any result path 180 and so will not be traversed, which achieves pruning.

If a breadth-first search 155 reaches a set of vertices on the current horizon from which no untraversed edges leave, then that breadth-first search 155 successfully terminates. Eventually, all vertices that are reachable from source vertices 121-122 are visited, including target vertices 124-125. This occurs when all breadth-first searches 155 have finished, at which time first pass 150 successfully terminates.

Some of breadth-first searches 155 may traverse more edges than other breadth-first searches 155 for graph search request 140. For example, if a breadth-first search 155 that originates at source vertex 122 is performed first, then edges 132-134 are traversed and marked, and target vertices 124-125 are reached. Whereas subsequently, when a breadth-first search 155 that originates at source vertex 121 is performed, then breadth-first search 155 terminates after traversing and marking edge 131, because upon reaching source vertex 122, no remaining unmarked edges are available for continued traversal.

A breadth-first search 155 need not terminate upon reaching a target vertex. For example, a breadth-first search 155 that traverses edge 133 to visit target vertex 124 may subsequently traverse edge 134 to reach target vertex 125 during the next iteration of the same breadth-first search 155.

At the end of first pass 150, edges 131-134 have been traversed and are marked and shown in bold, and edges 135-136 have not been traversed and are unmarked and not bold. All of marked edges 131-134 together constitute edge subset 160. Determination of edge subset 160 is the purpose of first pass 150.

2.3 First Pass Pseudo-Code

To perform first pass 150, computer system 100 may execute logic such as the following iterative pseudo-code:

```
procedure firstPass(set<vertex> sourceVertices, expr constraints)
    foreach(src : sourceVertices)
        // Perform BFS traversal starting from vertex src
        // by going though only edges which meet the constraints
        // When visiting vertex n, mark all of its outgoing edges
        breadthFirstSearch(src)
            visit(vertex n)
                foreach(e: n.outEdges where constraints.eval( ) )
                    e.marked = true;
```

This pseudo-code is for an embodiment that only traverses edges that satisfy given edge constraints. This pseudo-code could be readily modified to also accommodate vertex constraints. This pseudo-code operates without knowing which vertices are target vertices.

2.4 Depth-First Searches During a Second Pass

After first pass 150, computer system 100 performs second pass 170. Second pass 170 traverses graph 110 in a direction that is backwards compared to first pass 150. During second pass 170, computer system 100 performs separate depth-first searches 175 that each originate at a respective target vertex 124-125. The goal of depth-first searches 175 is to quickly determine result paths 180.

Each depth-first search 175 proceeds similarly to a depth-first search. However because depth-first search 175 proceeds in reverse from a target vertex, depth-first search 175 traverses an edge in the opposite direction of the edge. For example, a depth-first search 175 that currently visits vertex 123 may next traverse edge 132 but not edge 133, because traversal by depth-first search 175 only occurs against the direction of an edge.

Depth-first search 175 only traverses marked edges, which are those of edge subset 160. For example, a depth-first search 175 that currently visits vertex 124 may next traverse edge 133 but not edge 136, because traversal by depth-first search 175 ignores unmarked edges.

Each depth-first search 175 may have its own traversal stack of edges and vertices that the depth-first search 175 has traversed or visited. When depth-first search 175 traverses an edge to visit another vertex, depth-first search 175 pushes the vertex and edge onto the top of its stack.

In an embodiment, only references of the vertex and the edge are pushed onto the stack. As such pushing does not involve copying data, because pushing occurs by reference and not by value. A reference may be a pointer, an array index, or some other identifier.

During depth-first search 175, backtracking occurs per depth-first search. Depth-first search 175 may leave a vertex, perhaps to visit a multitude of other vertices at arbitrary distances from that vertex, even before traversing all of the marked edges that leave that vertex. Backtracking involves later revisiting an already visited vertex to perform traversal of another marked edge, of that vertex, that has not yet been traversed.

When depth-first search 175 has already traversed all edges that leave a vertex currently being visited, then depth-first search 175 backtracks. Ordinarily, depth-first search 175 traverses an untraversed edge against the direction of the edge. However during backtracking, depth-first search 175 traverses an already-traversed edge in the direction of the edge.

Backtracking can also be performed on an undirected edge, if graph 110 is undirected. Regardless of whether the edge is directed or undirected, the edge is chosen for backtracking because the edge is on the top of the stack of depth-first search 175. As such, when depth-first search 175 decides to backtrack, depth-first search 175 pops an edge and a vertex from the top of the stack and backtracks across that edge.

If one depth-first search 175 is ready to backtrack, but the stack contains no edge, then that depth-first search 175 successfully terminates. This can only occur when backtracking brings depth-first search 175 back to the target vertex from which the depth-first search 175 originated and all marked edges that leave the target vertex have already been traversed by the depth-first search 175. However, other depth-first searches 175 of a same second pass 170 may continue processing.

Multiple depth-first searches 175 of a same second pass 170 operate entirely independent of each other. This is unlike breadth-first searches 155 of a same first pass 150 that used marking to interoperate, such that no edge is ever traversed by more than one breadth-first search 155 of first pass 150. As such, multiple depth-first searches 175 of a same second pass 170 may traverse a same edge, although likely not together at a same time.

Additional processing occurs whenever depth-first search 175 reaches a source vertex. Depth-first search 175 creates a reversed copy of the contents of its stack. This copy is a result path 180.

After processing the source vertex, then depth-first search 175 may continue traversing available edges or else begin backtracking. For example, after depth-first search 175 visits source vertex 122, then depth-first search 175 may traverse edge 131 to reach source vertex 121.

After all depth-first searches 175 finish, then second pass 170 successfully terminates. At this time, all result paths 180 have been determined. Result paths 180 are actionable. For example, computer system 100 may save them, perform additional processing on them, or return them to a client or caller that issued graph search request 140.

2.5 Second Pass Pseudo-Code

To perform second pass 170, computer system 100 may execute logic such as the following recursive pseudo-code:

```
procedure secondPass(set<vertex> sourceVertices, set<vertex>
destinationVertices)
    foreach(dst : destinationVertices)
        List stack ={dst};
        set<vertex>reached = { };
        recursiveDepthFirstSearch(dst, sourceVertices, stack, reached);
procedure recursiveDepthFirstSearch (vertex n, set<vertex>
srcs, List<> stack,
set<vertex> reached)
    if (srcs.contains(n))
        // reached a source, make a result path
        path P = stack.reverse( ).asPath( );
        resultSet.add(P);
        reached.add(n);
        srcs.remove(n);
    if (srcs.size( ) > 0)
        for(e: n.inEdges where e.marked)
            vertex m = e.fromNode( );
            if (!stack.contains(m)) // avoid cycle
            stack.push(e); stack.push(m);
            expandRecursive(m, srcs, stack, reached)
            stack.pop( ); stack.pop( ); // backtrack
    if (reached.contains(n))
        // Partial reset to enable the other depth-first searches
        // to reach the same source
        reached.remove(n);
        srcs.add(n);
```

This pseudo-code is for an embodiment that only finds one path between each source vertex and each target vertex. This pseudo-code could be readily modified to return all possible result paths.

This pseudo-code is for an embodiment that excludes paths that contain a cycle. This pseudo-code could be readily modified to return paths that contain simple cycles. A simple cycle is a path that repeatedly visits a vertex without repeatedly traversing any edges.

This pseudo-code is for an embodiment in which each result path has an alternating sequence of vertices and edges. This pseudo-code could be readily modified to return result paths that enumerate only edges or only vertices.

3.0 Example Fast Process for Path-Finding Queries

Figure 2:
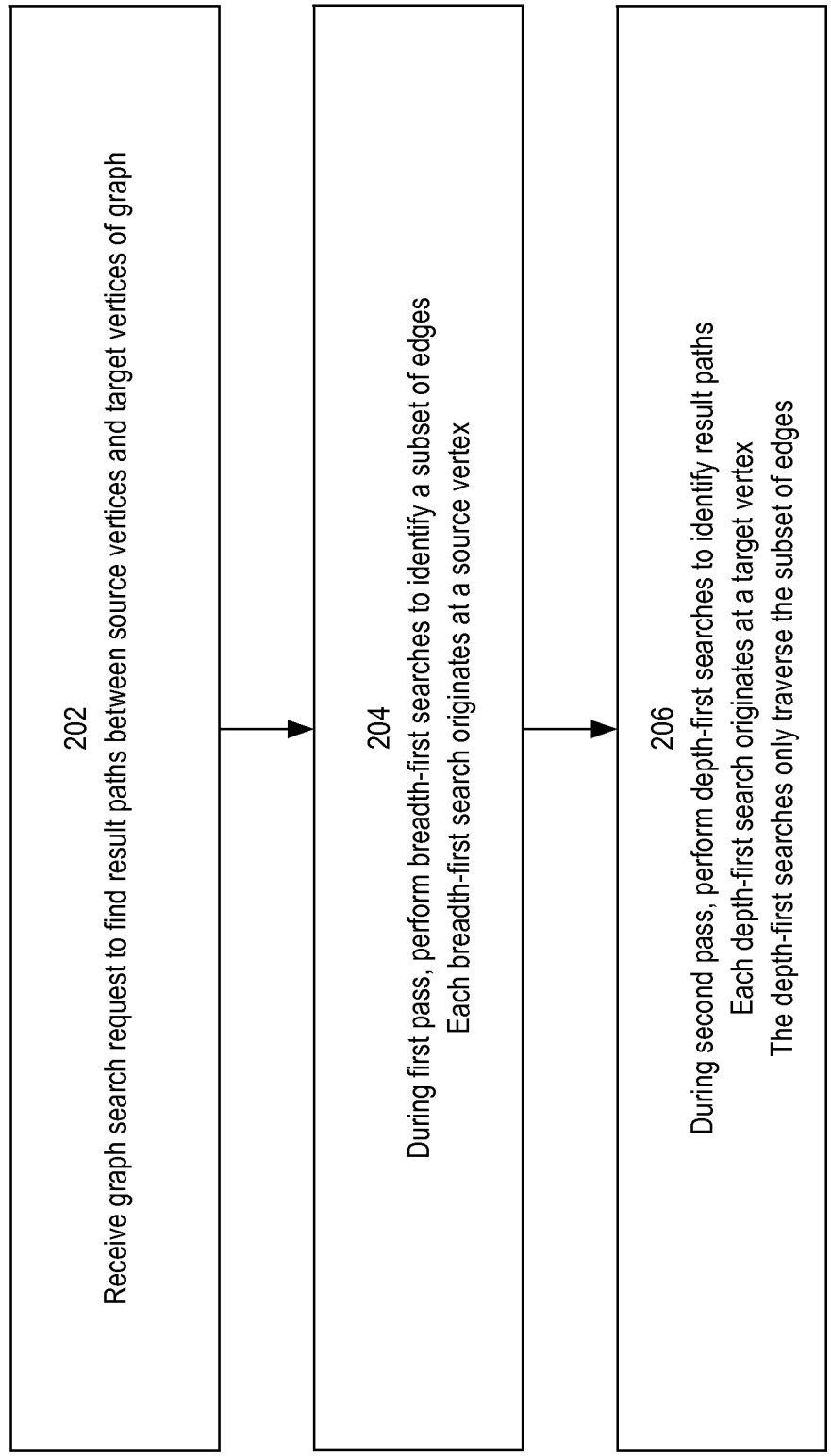
FIG. 2 illustrates an example fast process for path-finding queries, according to an embodiment.

FIG. 2 depicts a flow diagram of an example fast process for path-finding queries based on two passes. For illustrative purposes, FIG. 2 is discussed in relation to FIG. 1.

In step 202, a computer system receives a request to search a graph for paths from source vertices to target vertices. For example, computer system 100 may receive graph search request 140 to find a set of result paths 180 within graph 110.

Computer system 100 may receive graph search request 140 in a network message, by shared memory, thru an inter-process pipe, in a file, or other delivery mechanism. Computer system 100 may instead internally generate graph search request 140.

Graph search request 140 specifies one or more source vertices and one or more target vertices. Graph search request 140 may also specify additional constraints, such as identifying particular edges or vertices that must be in each result path 180. Other constraints may include subtypes of vertices or edges, a distance limit, or a result count limit.

In step 204, the computer system performs a first pass to mark relevant edges. This involves executing a breadth-first search from each source vertex. For example, computer system 100 performs first pass 150, during which breadth-first searches 155 are performed.

If an edge is directed, then breadth-first search 155 can only traverse the edge in the direction of the edge. Breadth-first searches 155 of a same first pass 150 collaborate by marking each edge when the edge is traversed, so that no edge is repeatedly traversed. A vertex may be repeatedly visited if reachable thru different edges.

A breadth-first search 155 successfully terminates if it reaches a vertex from which no unmarked edges are available to traverse. A breadth-first search 155 need not terminate upon reaching a target vertex.

First pass 150 successfully terminates when all breadth-first searches 155 have finished. Upon finishing, edge subset 160 contains all marked edges and no unmarked edges.

In step 206, the computer system performs a second pass to determine result paths. This involves executing a depth-first search from each target vertex. For example, computer system 100 performs second pass 170, during which depth-first searches 175 are performed.

Depth-first search 175 may only traverse marked edges, which are those of edge subset 160. If an edge is directed, then depth-first search 175 can only traverse the edge against the direction of the edge. Each depth-first search 175 is independent and generally has no effect on other depth-first searches 175 of a same second pass 170.

Each depth-first search 175 maintains a traversal stack of vertices and edges, which serves two purposes. When depth-first search 175 reaches a source vertex, then the contents of the stack define a result path. Also upon reaching a source vertex, depth-first search 175 may continue to traverse or backtrack.

The stack also enables backtracking. Because depth-first search 175 pushes a vertex and an edge onto the stack when depth-first search 175 traverses the edge, backtracking to a prior vertex is accomplished by popping the vertex and edge off of the stack.

A depth-first search 175 successfully terminates when backtracking brings depth-first search 175 back to the original target vertex of depth-first search 175 and the stack of depth-first search 175 has no edge to pop.

When all depth-first searches 175 have finished, then second pass 170 successfully terminates, at which time all result paths 180 have been determined. Result paths 180 are actionable and may be saved to disk or a database, shared with interested parties, returned to an internal caller or an external client, or further processed by computer system 100.

4.0 Simple Cycle

Figure 3:
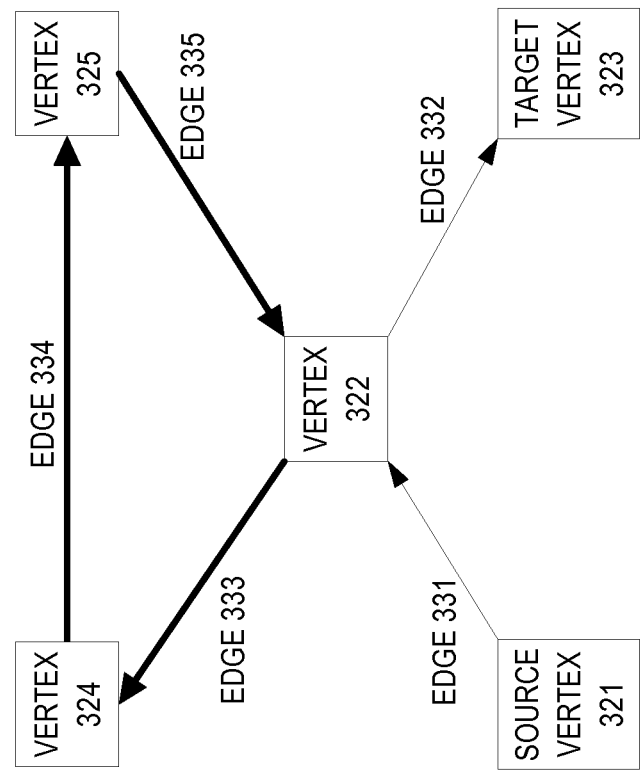
FIG. 3 is a logical block diagram illustrating an example graph in which certain techniques described herein may be implemented, according to various embodiments.

FIG. 3 depicts graph 300 with a simple cycle. A simple cycle is a path that repeatedly visits a vertex without repeatedly traversing any edges.

Edges 333-335 form a simple cycle shown in bold, such that vertex 322 is visited twice in a result path that traverses from source vertex 321, to vertex 322, around the simple cycle, back to vertex 322, and finally to target vertex 323.

The second pass pseudo-code presented above does not traverse simple cycles. The pseudo-code avoids a simple cycle by checking whether the stack already contains a next vertex before traverse a next edge to a next vertex. If the stack contains the next vertex, then the next edge is not traversed.

This pseudo-code can be readily modified to enable traversal of simple cycles. Instead of checking whether the stack already contains the next vertex, the modified pseudo-code would check whether the stack contains the next edge. Such modification would allow a depth-first search to revisit a vertex, which is necessary to traverse a simple cycle.

5.0 Conjunct Paths

Figure 4:
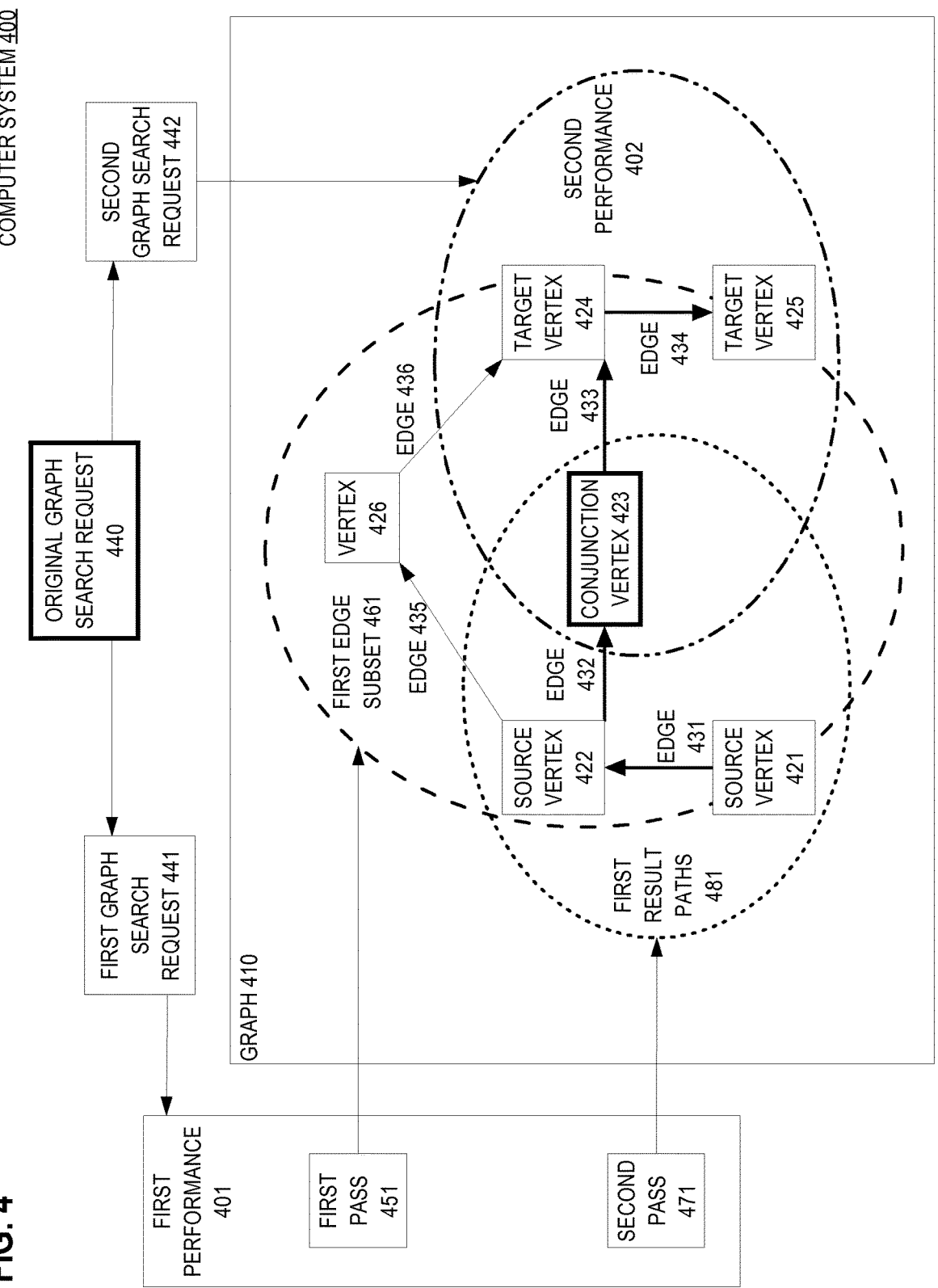
FIG. 4 is a logical block diagram illustrating an example computer system in which certain techniques described herein may be implemented, according to various embodiments.

FIG. 4 illustrates a block diagram of example computer system 400 that composes result paths from conjunct paths, in which techniques described herein may be practiced. Computer system 400 may be an embodiment of computer system 100.

5.1 Search Request Decomposition

Computer system 400 may decompose a graph search request that specifies a particular intermediate vertex into constituent graph search requests that each produce partial result paths. Computer system 400 then concatenates partial result paths to synthesize complete result paths. For example, a search request to find truck routes from San Francisco to New York City by way of Denver may be split into a request for routes from San Francisco to Denver and a request for routes from Denver to New York City.

Graph search request splitting does not reduce the amount of edges traversed and marked during breadth-first searches of the first pass. As such, splitting does not accelerate the first pass. However, splitting does reduce the amount of edges traversed during the depth-first searches of the second pass, by a factor that is proportional to the amount of target vertices. As such, splitting accelerates computer system 400.

In operation, computer system 400 receives original graph search request 440 that specifies source vertices 421-422, target vertices 424-425, and conjunction vertex 423, which is an intermediate vertex thru which all result paths must traverse. From original graph search request 440, computer system 400 generates two constituent graph search requests 441-442.

First graph search request 441 specifies source vertices 421-422 and conjunction vertex 423 as a target vertex. Second graph search request 442 specifies conjunction vertex 423 as a source vertex and target vertices 424-425.

Computer system 400 processes first graph search request 441 by performing first performance 401. Second performance 402 performs second graph search request 442. Performances 401-402 are independent of each other. They disregard the edge markings of each other.

Either of performances 401-402 may be performed first, or they may occur together. Each of performances 401-402 has its own first pass of breadth-first searches and its own second pass of depth-first searches. Each first pass of performances 401-402 identifies its own edge subset. An edge may be contained in either edge subset, neither, or both.

5.2 First Performance

In this example, the breadth-first searches of first pass 451 during first performance 401 traverses and marks all of the edges 431-436 of graph 410. As such, all of edges 431-436 are contained in first edge subset 461 of first pass 451, shown as a dashed circle. Because generated first graph search request 441 specifies only conjunction vertex 423 as a target vertex, during second pass 471 only edges 431-432 are traversed and included in first result paths 481, shown as a dotted ellipse.

5.3 Second Performance

The edge subset and result paths of second performance 402 are not labeled in FIG. 4 because the dash-dotted ellipse shown for second performance 402 exactly encompasses the edge subset and result paths of second performance 402. Because generated second graph search request 442 specifies only conjunction vertex 423 as a source vertex, the edge subset and result paths of second performance 402 include only edges 433-434.

5.4 Result Path Concatenation

After completing both performances 401-402, final result paths must be assembled from first result paths 481 of first performance 401 and the second result paths of second performance 402. Computer system 400 does this by concatenating each of the second result paths to each of first result paths 481, in a combinatorially exhaustive fashion. For example, if a first performance identified four paths, and a second performance identified five paths, then final assembly of those would produce 4×5=20 result paths, despite only needing to identify 4+5=9 paths during traversal.

Although FIG. 4 has only one conjunction vertex 423, instead original graph search request 440 may specify a sequence of conjunction vertices. For example original graph search request 440 may seek routes between San Francisco and New York City that visit Salt Lake City, Denver, and Chicago along the way.

As such, the automatic decomposition of original graph search request 440 into constituent graph search requests may involve generating more than two constituent graph search requests. Likewise, assembly of final result paths may involve concatenation of more than two conjunct paths for each final result path.

6.0 Queries and Graph Databases

A conjunction vertex is one example of a constraint that can be specified in a graph search request. There are other kinds of constraints. The more complex is a graph, then the more useful are constraints to isolate interesting paths.

Likewise, the more kinds of constraints are wanted, then the greater is the need to express a graph search request in a query language that has a grammar dedicated to encoding constraints. Examples include graph query languages such as SPARQL or Cypher.

For example, a graph may occupy a large graph data store such as a resource description framework (RDF) triplestore, a graph database, a geographic database, a spatial database, or a relational database with a reflexive relation or a cyclic combination of relations. Any of these are amenable to a graph search request expressed as a semantic query or other query. A semantic query is used for content-specific traversal through a large data set.

A context-free path query is a query that uses a limited regular expression to specify relation traversal according to pattern matching that can be evaluated directly at each edge without considering context. For performance reasons, pattern-based repetition is not allowed within a context-free path query This is distinguished from an ordinary structured query language (SQL) command that can only express a traversal across specific relations. Specifically, a context-free path query can specify constraints that are free of context, whereas SQL cannot.

For example a query to find car routes between either of two particular east coast cities and either of two particular west coast cities along either a dirt road or a paved road would be difficult to express in SQL but straightforward with a context-free path query. Such a context-free path query might have an expression such as: {Boston, Miami} (dirt-|paved) {Seattle, Oakland}.

In this example context-free path query, Boston and Miami are source vertices, and Seattle and Oakland are target vertices. The query includes edge constraints that specify either a dirt or paved road.

A first pass of breadth-first searches can be configured to mark edges only along those traversals having a dirt or paved road that connects the endpoints.

As was shown in FIG. 4, an original graph search request may be expressed as conjunctions of smaller graph search requests. Such composability also readily applies to context-free path queries. A conjunctive context-free path query is a query that concatenates multiple context-free path queries into a sequence.

For example, a conjunctive context-free path query might have an expression that further constrains result paths to those that pass thru Denver, such as: {Boston, Miami} dirt {Denver} paved {Seattle, Oakland}. Conjunctive context-free path queries are amenable to the graph search request decomposition techniques described herein.

7.0 Parallelization

A car that traverses its way thru a Manhattan-style city grid of streets must make a choice between three departing edges at each traffic light intersection. A seemingly moderate route of only twenty intersections would involve an aggregate choice between $3^{20} \approx 3.5$ billion distinct routes. As such, acceleration of graph search by parallelization may be important for non-trivial graphs.

Figure 5:
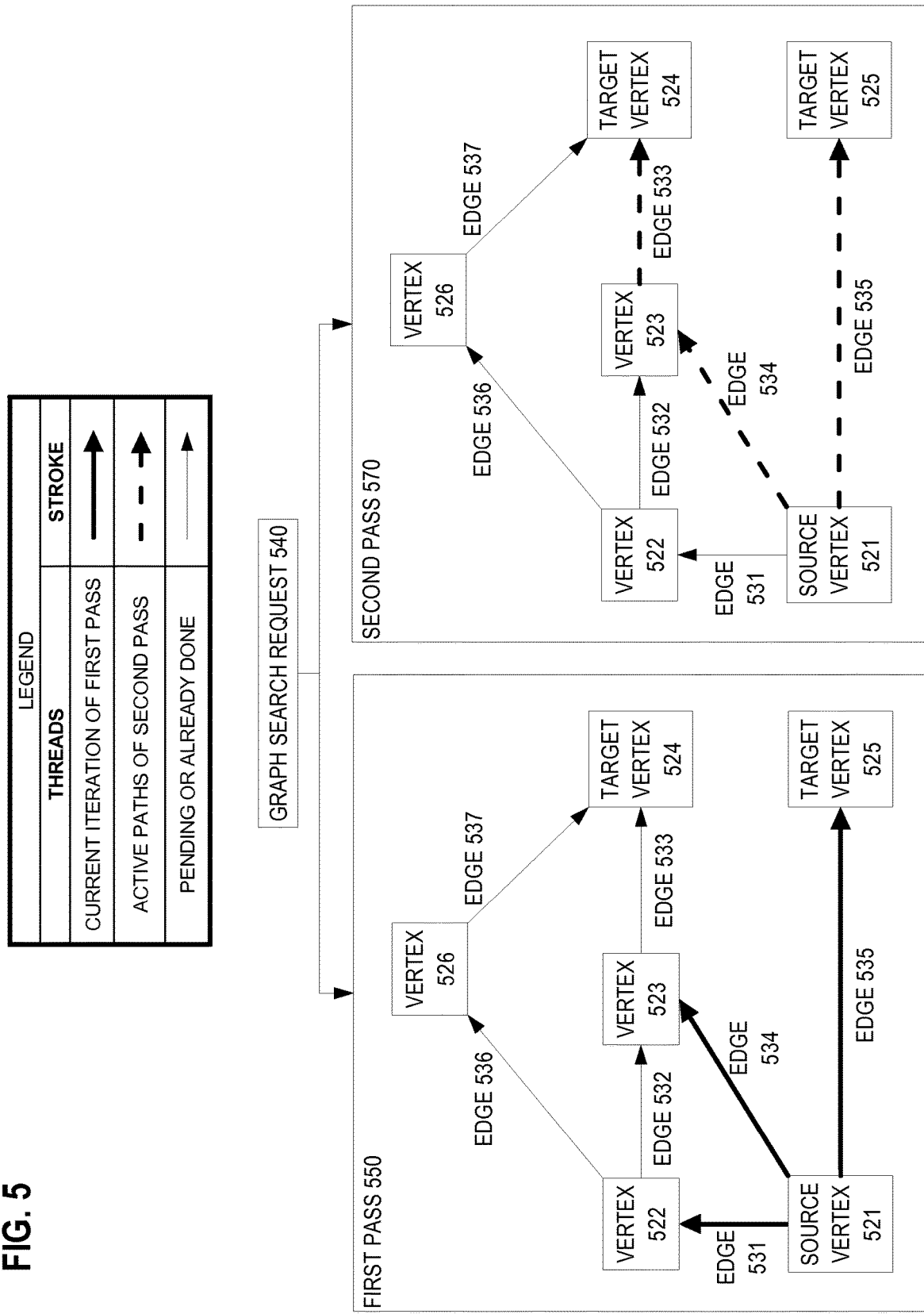
FIG. 5 is a logical block diagram illustrating an example graph search request in which certain techniques described herein may be implemented, according to various embodiments.

FIG. 5 illustrates a block diagram of example graph search request 540 that is accelerated by parallel traversals, in which techniques described herein may be practiced. Multicore and other symmetric multiprocessing computer architectures are well suited for parallelizing computationally intensive logic employed on huge datasets. With federation paradigms such as distributed shared memory or bulk synchronous parallel, parallelization techniques may also be somewhat portable to cluster computing, such as with a Hadoop or Beowulf cluster.

Multicore may be the most cost effective parallelization hardware for data centers. Multicore is readily exploited by programming languages with a multithreaded memory model, such as Java. Work stealing is a multithreading paradigm that is designed to achieve maximum utilization of multiple cores by load balancing. The fork/join framework is a standardized way for Java to perform work stealing. Similar frameworks exist for other popular programming languages, such as portable operating system interface (POSIX) threads.

The parallelization techniques herein are readily amenable to implementation with multithreading and especially work stealing. For example any of visiting a vertex, traversing an edge, traversing an entire path, backtracking, or performing a search from a given source vertex or target vertex may be implemented as a dispatchable unit of work.

Graph search request 540 is processed by parallelized breadth-first searches of first pass 550 and subsequently by parallelized depth-first searches of second pass 570. However, because the architectures of iterative breadth-first search and recursive depth-first search are fundamentally different, their corresponding parallelization mechanisms are different.

7.1 Parallel Breadth-First Search

For best performance, an embodiment may implement the breadth-first searches of first pass 550 by using multi-source breadth-first search (MS-BFS), an algorithm which publicly debuted in 2014. However, there are other parallel breadth-first search algorithms that are less sophisticated and thus simpler and more widely available that may instead be used in an embodiment. For sake of clarity, MS-BFS is not used herein to fully describe parallelization, although MS-BFS may be regarded as a preferred technique where readily available.

In a parallelized embodiment, each breadth-first search of first pass 550 has its own thread. More or less care may be taken to coordinate threads as they mark and traverse edges and visit vertices. At a minimum, care may be needed to prevent data corruption.

A lesser concern is the prevention of duplicate effort, such as repeated traversal of a same edge by separate threads. Duplicate effort may be tolerated to the extent that it accomplishes the same results, although it may consume more electricity and possibly more time. For example, edge marking may be somewhat idempotent, in that no catastrophic harm comes from marking an edge more than once.

In another parallelized embodiment, first pass 550 decouples the identification of next edges from their traversal. As such, when next edges are identified, they are added to a pending set for later traversal. This is shown in first pass 550, where an initial iteration identifies edges 531 and 534-535, shown in bold, and adds them to the pending set.

The same thread or others may take an edge from the pending set and then traverse the edge. As such, bold edges 531 and 534-535 may be subsequently traversed in parallel, if three processor cores are available. The embodiment may use work stealing or a producer/consumer paradigm, perhaps with a thread pool.

The pending set may be implemented as a queue to preserve serial ordering of iterations if desired. However, serialization is not essential to the technique.

7.2 Parallel Depth-First Search

After first pass 550, processing of graph search request 540 shifts to the depth-first searches of second pass 570. The depictions of passes 550 and 570 show a same graph, but with different decoration to illustrate differences in parallelization mechanics.

In a parallelized embodiment, each depth-first search of second pass 570 has its own thread to traverse all paths originating from its respective target vertex. For example, dashed edges 533-535 show a first thread traversing from target vertex 525 and a second thread traversing along edges 533-534 from target vertex 524. With backtracking, the second thread would eventually also traverse edges 531-532 and 536-537.

In another parallelized embodiment, during second pass 570, an existing work unit forks an additional work unit when visiting a vertex having some configurable minimum amount of traversable edges. The existing and additional work units may each traverse half of the available edges.

When visiting that vertex, the existing work unit may fork multiple work units. An additional ability arises if the existing work units are configured to fork one work unit per available edge, regardless of how few edges. In this case, second pass 570 is able to entirely eliminate backtracking. For example, this might prevent an overflow of a call stack, which is something different from the edge/vertex stack described for FIG. 1.

In another parallelized embodiment, during second pass 570, a work unit is forked for reverse copying the traversal stack into a result path when a source vertex is reached. This presents a form of pipelining, because the depth-first search may simultaneously continue while reverse copying occurs. Such pipelining could achieve acceleration when processing a huge graph involves a deep stack and long result paths.

8.0 Limiting Results

Figure 6:
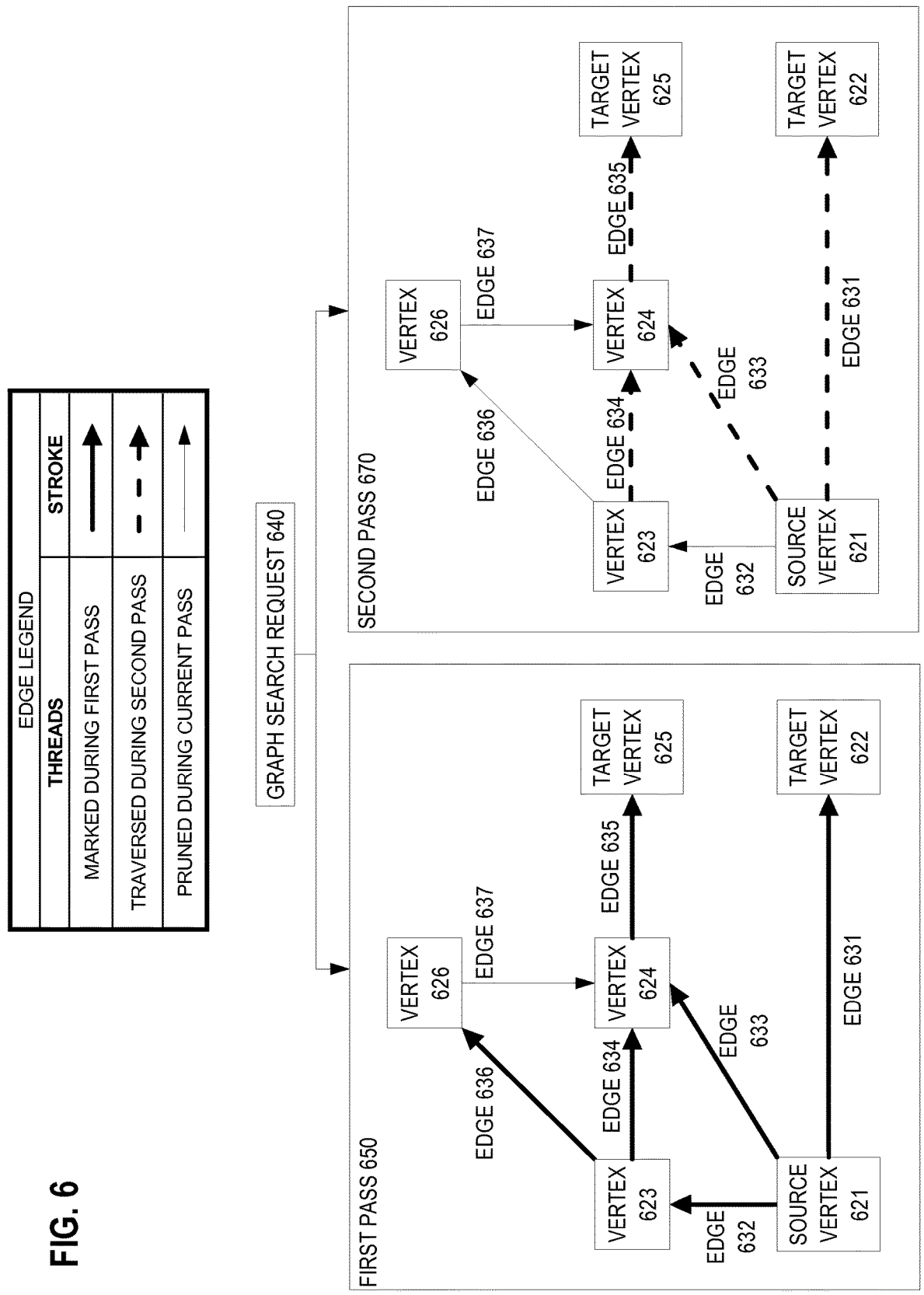
FIG. 6 is a logical block diagram illustrating an example graph search request in which certain techniques described herein may be implemented, according to various embodiments.

FIG. 6 illustrates a block diagram of example graph search request 640 that limits results to fewer than all possible paths, in which techniques described herein may be practiced. An amount of result paths may be limited by absolute length, relative length such as shortest, or amount. Such limits are specified in graph search request 640.

Some limits that regard path length may be more or less enforced during first pass 650. Path length limitations involve terminating a breadth-first search of first pass 650 when the horizon, which is the distance from the source vertex, becomes excessive.

For example if graph search request 640 specifies that result path length must not exceed two, then first pass 650 determines an edge subset of marked edges that includes all edges, except edge 637. Edge 637 is not marked during such a first pass 650 because edge 637 lies beyond a horizon whose distance from source vertex 621 is two edge traversals. Edges 631-633 lie at a distance of one and are well within the horizon of two. Edges that lie just barely within the horizon are edges 634-636. After traversing edges 634-636, the breadth-first search has exhausted the horizon and terminates.

A length limit of a graph search request may instead be relative, such as requesting shortest paths from each source vertex to each target vertex, which is the all pairs shortest paths problem. The lengths of shortest result paths may be unknown when a first pass begins. For this scenario, final horizons are independently set for each breadth-first search. The final horizon is set when the breadth-first search reaches its furthest target vertex, at which time the breadth-first search has reached all target vertices, completes its current iteration, and terminates.

In the case of such a first pass, the shortest path to target vertex 622 has a length of one. The shortest path to target vertex 625 has a length of two, which the breadth-first search discovers during a second iteration by traversing edge 635. Also during the second iteration, the breadth-first search traverses edges 634 and 636 and then terminates.

First pass 650 may attempt to enforce paths of a given length, such as a length of two as shown. However, this may still cause edges to be marked that should not be included in the result paths. For example, edges 632, 634, and 636 are within a horizon of two and are marked, but cannot be part of any result path of length two.

As such, second pass 670 must also enforce a limit on result path length. A depth-first search of second pass 670 may enforce the length limit by checking the amount of edges on the traversal stack of the depth-first search. If the stack already has two edges, then the depth-first search should not traverse beyond its current vertex and instead should backtrack. For example after a depth-first search of second pass 670 reaches vertex 623 by traversing edge 634, then the stack has edges 634-635, which is the limit of two. As such, upon reaching vertex 623, the depth-first search has a full stack and should backtrack.

Another limit that graph search request 640 may specify is a limit on the amount of result paths. This can be achieved by terminating all depth-first searches of a second pass after accumulating a desired amount of result paths.

9.0 Archetypal Applications

The graph search techniques described herein are well suited and readily applicable as a new mechanism for accelerating the solving of classic categories of graph search problems. Examples include centrality, flow, and all pairs.

Graph centrality algorithms identify vertices that occupy topologically important points of connectivity within a graph. Graph centrality problems may detect an amount of distinct paths that include a given vertex or that have that vertex as an endpoint. A computer system may calculate centrality to identify influential people in a social graph, critical points of infrastructure, or reputable resources in a webgraph of the Internet. The computer system may calculate centrality to discover places or creatures of significance in epidemiological or evolutionary events.

The techniques embodied in a computer system may be used for network flow analysis such as for logistics and routing. These tend to be computationally intractable problems due to the combinatorics involved. The techniques described herein may achieve acceleration by reducing the computational complexity of graph search.

All pairs shortest paths is another graph search problem that can benefit from accelerated determination of result paths that traverse between each of a set of source vertices and each of a set of target vertices. Boosting the efficiency of involved mechanisms for finding shortest paths may rely on pruning techniques described herein.

9.1 Call Graph

Figure 7:
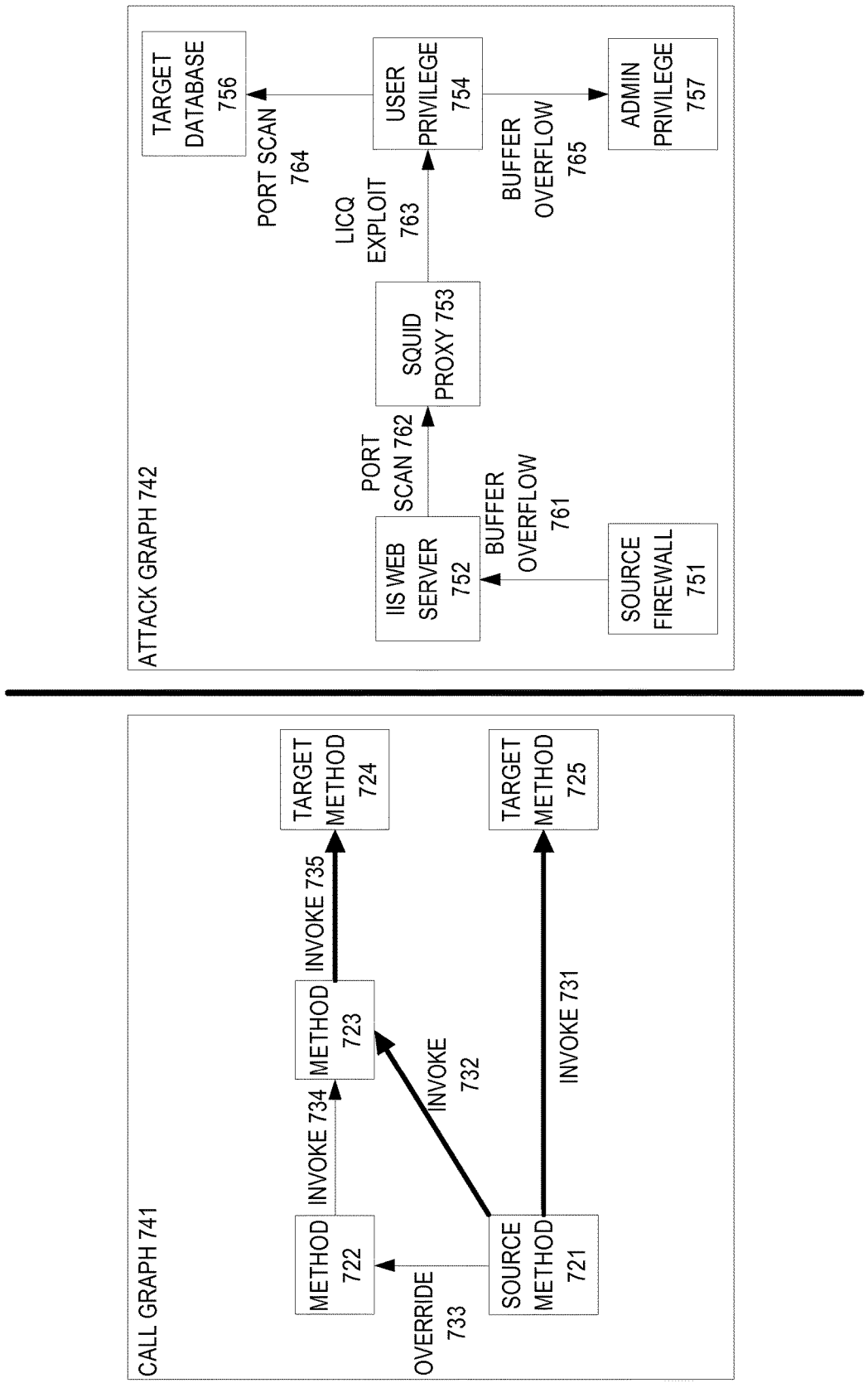
FIG. 7 is a logical block diagram illustrating an example graphs in which certain techniques described herein may be implemented, according to various embodiments.

FIG. 7 illustrates a block diagram of example application specific graphs 741-742, in which techniques described herein may be practiced. Call graph 741 depicts a graph that shows dependencies between methods defined in an object oriented programming language.

In this example, call graph 741 is static because it was generated by static program analysis of logic such as source code or bytecode. A static call graph can be used for finding unused methods or to help identify ways to reorganize the partitioning of subroutine implementations amongst libraries.

Each participating method is shown as a vertex, such as methods 721-725. An invocation of one method by another is shown as a particular subtype of edge, such as invocations 731-732 and 734-735. When one method is overridden by another method thru polymorphic inheritance, then this is shown as another subtype of edge, such as override 733.

Overrides are not technically part of a call graph, and so should be excluded during a search for call paths within call graph 741. As such, a graph search request may specify a constraint that result paths should have only invocation edges and not override edges.

When such a constraint is specified, the breadth-first search of a first pass would not traverse override 733, because this edge is of a subtype that is excluded by the edge subtype constraint of the graph search query. As such, only invocation edges 731-732 and 735 are traversed, marked, included in the edge subset, and shown in bold.

For example, an unused method is one that is specified as a target vertex of a graph search request, but for which no result path can be found from any source vertex or at least from any interesting source vertex, such as those that represent public methods. In another example during reorganizing class libraries, if the source vertices are the methods of one subsystem, the target vertices are the methods of another subsystem, and no result paths can be found between them, then those subsystems are candidates for residence in separate libraries.

In another embodiment, a call graph could be dynamic, in which case the graph is generated according to actual invocation patterns that occurred during execution of a computer program. A dynamic call graph may be used to detect a code injection attack, where an invocation of a malicious subroutine is secretly added. For example, if the source vertex is the main entry point method of a program that should not send email, the target vertices are email methods, then any result path found indicates that unauthorized email was sent.

9.2 Attack Graph

FIG. 7 also illustrates attack graph 742, which is for a different kind of application. Attack graph 742 may be used for an application that does intrusion detection or network vulnerability analysis. Each edge of attack graph 742 may represent a particular instance of an attack vector, which is an exploit that achieves an individual step of an attack, such as accessing a host or elevating a privilege. Alternatives or combinations of attack vectors form an attack surface or attack graph, which is a distributed environment that an attack may traverse to reach a desired target, such as a database of demographic data for identity theft.

A static attack graph represents prospective potential vulnerability. A dynamic attack graph represents a trace of traversals exercised during an actual observed attack, such as during a security exercise. Traversal analysis of a static attack graph can identify crucial network elements that if made more secure would confer significant protection. Traversal analysis of a dynamic attack graph can reveal which data was likely stolen.

For example, a graph search request may specify network firewalls as source vertices and confidential databases as target vertices. Result paths are the ways for a potential attack. Corporate and institutional networks can be extensive. Although attack graph 742 has only one source vertex 751 and one target vertex 756, a realistic attack graph would be much larger and offer many source vertices and many target vertices.

Programming languages with a modern memory model, such as Java, have a memory stack and a memory heap that are almost impossible to corrupt. However for performance or sunk cost, generic software infrastructure such as an operating system or middleware may be written in a language such as C or C++ that is vulnerable to memory exploits such as buffer overflow or pointer double free. This is shown as buffer overflow edges 761 and 765 and linear independence constraint qualification (LICQ) exploit edge 763.

A host on a network may have network ports open to interoperate with other hosts. An attacker may probe for such open ports, shown as port scan edges 762 and 764.

An attacker may use combinations of these exploits to intrude from host vertex to host vertex, such as source firewall 751, internet information services (IIS) web server 752, and Linux host 753. Other exploits may be used to elevate privilege, such as from user privilege vertex 754 to administrator privilege vertex 757.

A large and complex attack graph could be queried with graph search requests that are constrained to particular types of exploit edges, internal host vertices, exposed source vertices, or valuable target vertices. Queries may be rerun after patching installed software, adding hosts, or otherwise altering a network topology.

9.3 Pointer Graph

Figure 8:
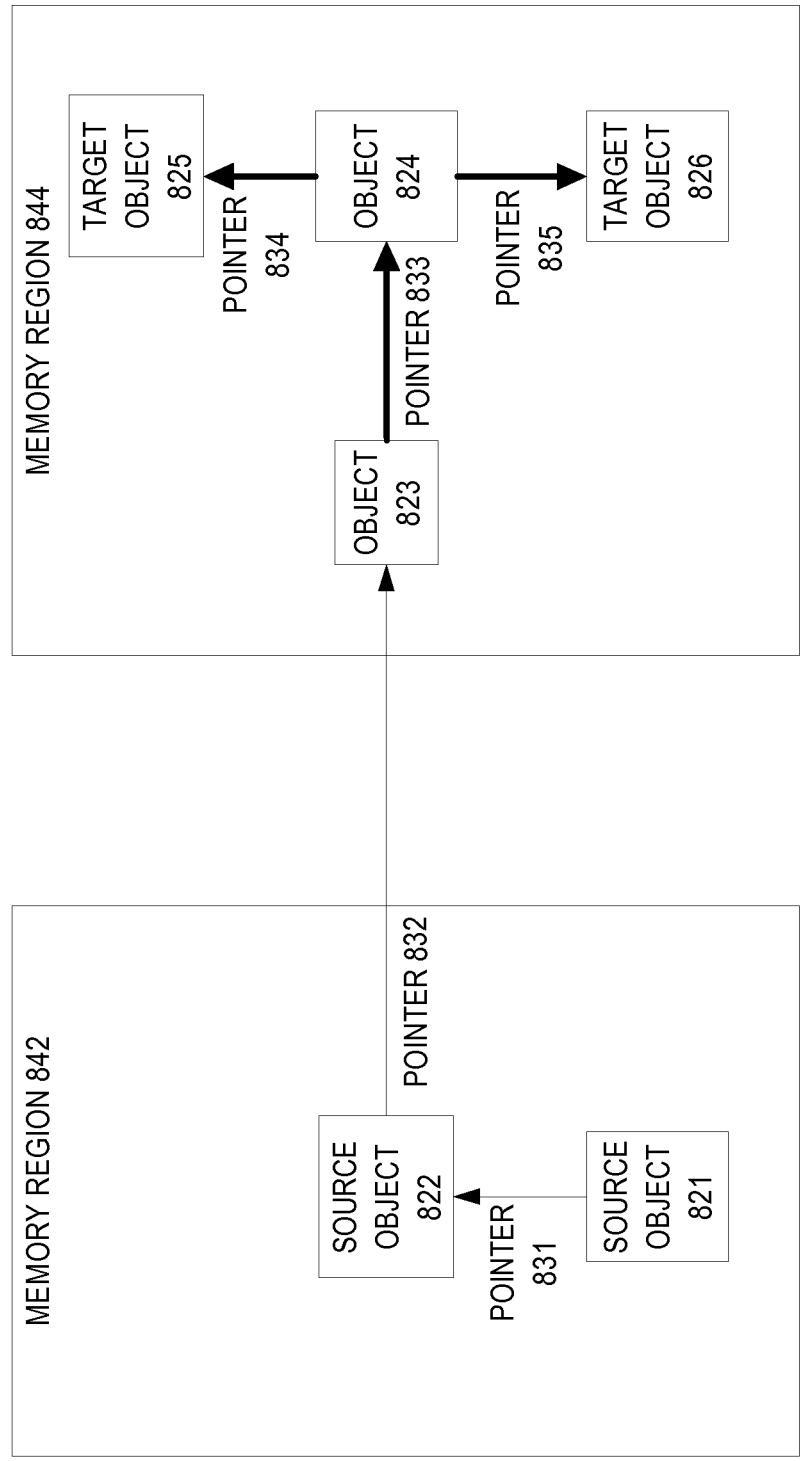
FIG. 8 is a logical block diagram illustrating an example graph in which certain techniques described herein may be implemented, according to various embodiments.

FIG. 8 illustrates a block diagram of example pointer graph 840, in which techniques described herein may be practiced. Each vertex of pointer graph 840 represents an object that occupies memory or other storage of a computer system. Each object may be a data structure that can be described by a programming language and accessed by a computer program.

Each edge of pointer graph 840 represents a memory reference that is embedded within the object from which it originates. Each memory reference refers to another object in memory. Each memory reference may be a memory pointer, a memory offset, an array index, an object handle, or any other datum that uniquely identifies an object in memory.

Pointer graph 840 spans memory that is partitioned into memory regions 842 and 844. Either are both of memory regions 842 and 844 may be a call stack, a stack frame, a heap region, a memory mapped file region, a file region on disk, a memory cache backed by durable storage, or other storage region that can contain structured referential data.

Pointer graph 840 may be static and generated by static code analysis. A static pointer graph represents a possible arrangement of memory contents that may potentially arise. Pointer graph 840 may instead be a dynamic graph that represents an actual arrangement of memory contents.

A dynamic pointer graph may be live, indicating the current contents of memory while a program currently executes. For example, memory regions 842 and 844 may be heap regions of different durational generations, such as an Eden space or a permanent space.

Graph search requests and result paths may be used to make automatic determinations in real time as to the reachability of objects during activities such as garbage collection, heap compaction, stack escape analysis, heap region escape analysis, or thread escape analysis. For example, a just in time (JIT) compiler may use escape analysis to decide that an object can be allocated directly on a call stack or accessed without thread synchronization.

A dynamic pointer graph may be historical, having been recorded during a program execution and perhaps saved as a heap dump. For example, memory region 842 may be a static region of a C program, and memory region 844 may be a heap. Graph search requests and result paths may be used for optimization of program initialization by detecting heap objects that would be better allocated in the static region. Result paths to excessive target vertices may indicate a memory leak. An intermediate vertex that is common to those result paths may be used to isolate the leak.

10.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
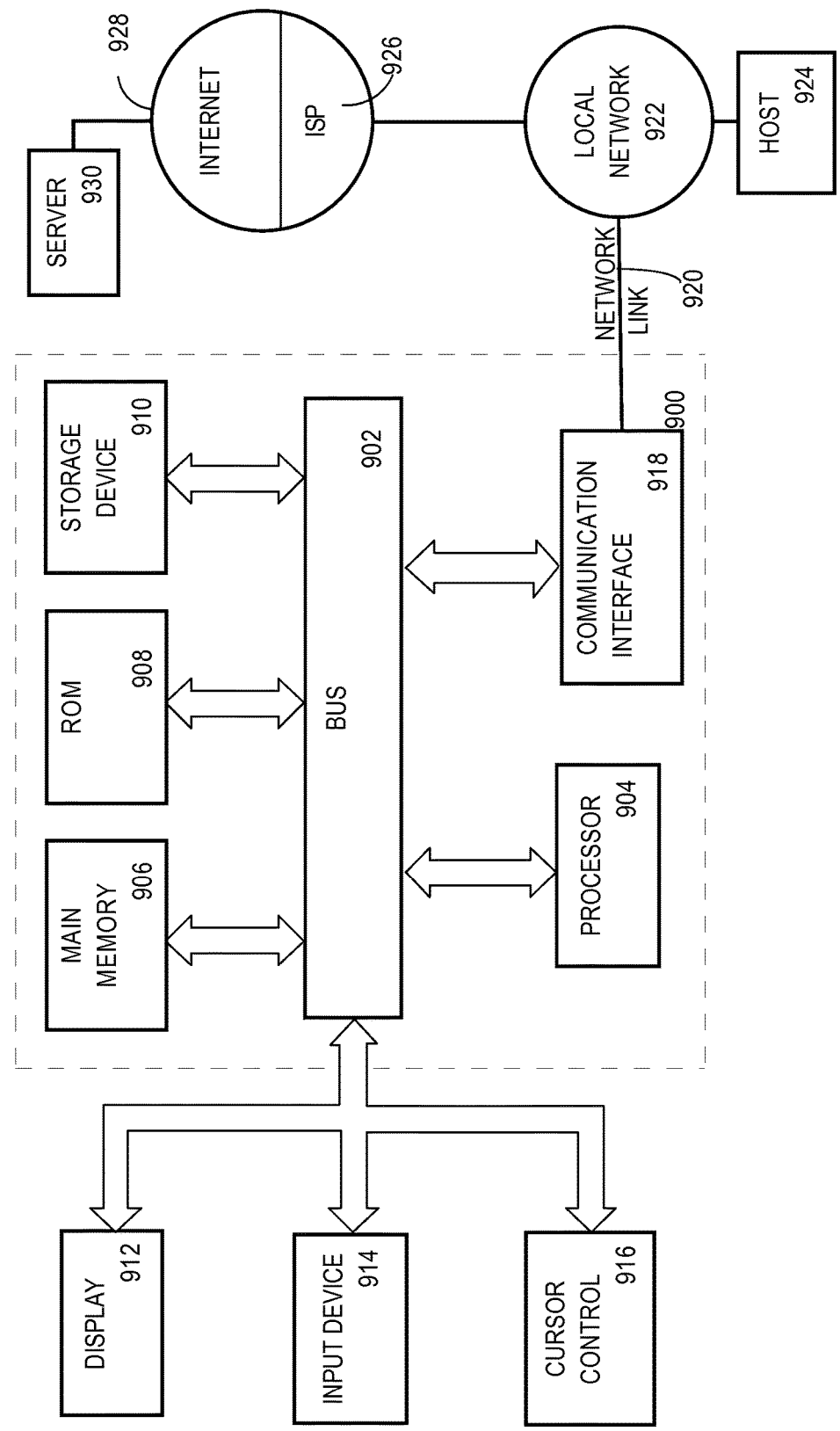
FIG. 9 is a block diagram illustrating one embodiment of a computer system suitable for implementing methods and features described herein.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a light emitting diode (LED) display, for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

11.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a graph search request to find a set of result paths between one or more source vertices of a graph and one or more target vertices of the graph, wherein the graph comprises vertices connected by edges, wherein the graph search request does not imply a fixed length for the result paths of the set of result paths;
during a first pass, performing one or more breadth-first searches to identify a subset of edges of the graph, wherein the one or more breadth-first searches originate at the one or more source vertices; and
after the first pass and during a second pass, performing one or more depth-first searches to identify the set of result paths, wherein each of the one or more depth-first searches originates at a respective vertex of the one or more target vertices, wherein the one or more depth-first searches traverse at most the subset of edges of the graph;
wherein the method is performed by one or more computers.

2. The method of claim 1 wherein each of the set of result paths comprises a sequence of edges of the graph, wherein the graph search request comprises one or more edge constraints, wherein each of the one or more edge constraints is satisfied by at least one of the sequence of edges of each of the set of result paths.

3. The method of claim 1 wherein each of the edges of the graph comprises a preceding vertex and a succeeding vertex, wherein each of the set of result paths comprises a sequence of unique edges of the graph, wherein at least one of the set of result paths contains two edges that have a same succeeding vertex.

4. The method of claim 1 wherein each of the set of result paths comprises a sequence of vertices of the graph, wherein the graph search request comprises one or more vertex constraints, wherein each of the one or more vertex constraints is satisfied by at least one of the sequence of vertices of each of the set of result paths.

5. The method of claim 4 wherein the one or more vertex constraints comprises a conjunction vertex, wherein the graph search request is an original graph search request, wherein the set of result paths is a set of combined result paths consisting of paths that include the conjunction vertex, wherein the method is performed twice and comprising a first performance and a second performance, wherein the graph search request of the first performance comprises a first graph search request to find a first set of result paths between the one or more source vertices and the conjunction vertex, wherein the graph search request of the second performance comprises a second graph search request to find a second set of result paths between the conjunction vertex and the one or more target vertices, wherein the first graph search request and the second graph search request are automatically derived from the original graph search request, wherein the set of combined result paths comprises paths assembled by appending one of the second set of result paths to one of the first set of result paths.

6. The method of claim 1 wherein performing one or more breadth-first searches comprises at least one selected from the group consisting of:
simultaneously traversing edges of the subset of edges having a same distance from one of the one or more source vertices,
performing a single multi-source breadth-first search (MS-BFS), and
searching in said graph.

7. The method of claim 1 wherein performing one or more depth-first searches comprises simultaneously traversing paths of the set of result paths that originate at different vertices of the one or more target vertices.

8. The method of claim 1 wherein work stealing is performed as part of the one or more depth-first searches.

9. The method of claim 1 wherein the one or more breadth-first searches are limited to at most a particular distance from the one or more source vertices.

10. The method of claim 1 wherein the one or more depth-first searches are limited to at most a particular distance from the one or more target vertices.

11. The method of claim 1 wherein the one or more depth-first searches are limited to identifying at most a particular amount of paths within the set of result paths.

12. The method of claim 1 wherein each of the one or more breadth-first searches is limited to a distance, from a respective source vertex of the one or more source vertices, equal to a length of a shortest path between the respective source vertex and a target vertex of the one or more target vertices.

13. The method of claim 1 wherein the graph search request comprises a context-free path query.

14. The method of claim 1 wherein the graph search request comprises a query expressed in a language of: SPARQL or Cypher.

15. The method of claim 1 wherein the graph comprises at least one graph selected from the group consisting of: a social graph, a subroutine call graph, and an attack graph.

16. The method of claim 1 wherein the method further performs, based on the set of result paths, analysis of at least one of: graph centrality or network flow.

17. The method of claim 1 wherein the method further performs, based on the set of result paths, at least one selected from the group consisting of: static code analysis, network vulnerability analysis, and intrusion detection.

18. The method of claim 1 wherein the method further performs, based on the set of result paths, at least one of: pointer analysis or memory leak detection.

19. The method of claim 1 wherein:
the graph search request specifies a plurality of source vertices;
said one or more source vertices comprises said plurality of source vertices.

20. The method of claim 1 wherein:
the graph search request comprises constraints that each path of the set of result paths must satisfy;
the constraints are evaluated during the first pass.

21. The method of claim 1 wherein:
the graph search request comprises constraints that each path of the set of result paths must satisfy;
the constraints are not evaluated during the second pass.

22. The method of claim 1 wherein the first pass does not depend on the one or more target vertices.

23. A computer system comprising:
a memory configured to store a graph, wherein the graph comprises vertices connected by edges; and
a processor connected to the memory and configured to:
receive a graph search request to find a set of result paths between one or more source vertices of the graph and one or more target vertices of the graph, wherein the graph search request does not imply a fixed length for the result paths of the set of result paths;

during a first pass, perform one or more breadth-first searches to identify a subset of edges of the graph, wherein the one or more breadth-first searches originate at the one or more source vertices; and after the first pass and during a second pass, perform one or more depth-first searches to identify the set of result paths, wherein each of the one or more depth-first searches originates at a respective vertex of the one or more target vertices, wherein the one or more depth-first searches traverse at most the subset of edges of the graph.

24. One or more non-transitory computer readable media comprising instructions that when executed by one or more processors cause:

receiving a graph search request to find a set of result paths between one or more source vertices of a graph and one or more target vertices of the graph, wherein the graph comprises vertices connected by edges, wherein the graph search request does not imply a fixed length for the result paths of the set of result paths;

during a first pass, performing one or more breadth-first searches to identify a subset of edges of the graph, wherein the one or more breadth-first searches originate at the one or more source vertices; and after the first pass and during a second pass, performing one or more depth-first searches to identify the set of result paths, wherein each of the one or more depth-first searches originates at a respective vertex of the one or more target vertices, wherein the one or more depth-first searches traverse at most the subset of edges of the graph.

25. The one or more non-transitory computer readable media of claim 24 wherein each of the set of result paths comprises a sequence of edges of the graph, wherein the graph search request comprises one or more edge constraints, wherein each of the one or more edge constraints is satisfied by at least one of the sequence of edges of each of the set of result paths.

26. The one or more non-transitory computer readable media of claim 24 wherein each of the edges of the graph comprises a preceding vertex and a succeeding vertex, wherein each of the set of result paths comprises a sequence of unique edges of the graph, wherein at least one of the set of result paths contains two edges that have a same succeeding vertex.

27. The one or more non-transitory computer readable media of claim 24 wherein each of the set of result paths comprises a sequence of vertices of the graph, wherein the graph search request comprises one or more vertex constraints, wherein each of the one or more vertex constraints is satisfied by at least one of the sequence of vertices of each of the set of result paths.

28. The one or more non-transitory computer readable media of claim 24 wherein performing one or more breadth-first searches comprises at least one selected from the group consisting of:

simultaneously traversing edges of the subset of edges having a same distance from one of the one or more source vertices, performing a single multi-source breadth-first search (MS-BFS), and searching in said graph.

29. The one or more non-transitory computer readable media of claim 24 wherein performing one or more depth-first searches comprises simultaneously traversing paths of the set of result paths that originate at different vertices of the one or more target vertices.

30. The one or more non-transitory computer readable media of claim 24 wherein said performing the one or more depth-first searches comprises work stealing.

31. The one or more non-transitory computer readable media of claim 24 wherein the instructions further cause limiting the one or more breadth-first searches to at most a particular distance from the one or more source vertices.

32. The one or more non-transitory computer readable media of claim 24 wherein the instructions further cause limiting the one or more depth-first searches to at most a particular distance from the one or more target vertices.

33. The one or more non-transitory computer readable media of claim 24 wherein the instructions further cause limiting the one or more depth-first searches to identifying at most a particular amount of paths within the set of result paths.

34. The one or more non-transitory computer readable media of claim 24 wherein the instructions further cause limiting each of the one or more breadth-first searches to a distance, from a respective source vertex of the one or more source vertices, equal to a length of a shortest path between the respective source vertex and a target vertex of the one or more target vertices.

35. The one or more non-transitory computer readable media of claim 24 wherein the graph search request comprises a context-free path query.

36. The one or more non-transitory computer readable media of claim 24 wherein the graph search request comprises a query expressed in a language of: SPARQL or Cypher.

37. The one or more non-transitory computer readable media of claim 24 wherein the graph comprises at least one graph selected from the group consisting of: a social graph, a subroutine call graph, and an attack graph.

38. The one or more non-transitory computer readable media of claim 24 wherein the instructions further cause, based on the set of result paths, analysis of at least one of: graph centrality or network flow.

39. The one or more non-transitory computer readable media of claim 24 wherein the instructions further cause, based on the set of result paths, at least one selected from the group consisting of: static code analysis, network vulnerability analysis, and intrusion detection.

40. The one or more non-transitory computer readable media of claim 24 wherein the instructions further cause, based on the set of result paths, at least one of: pointer analysis or memory leak detection.

41. The one or more non-transitory computer readable media of claim 24 wherein:

the graph search request specifies a plurality of source vertices;

said one or more source vertices comprises said plurality of source vertices.

42. The one or more non-transitory computer readable media of claim 24 wherein:

the graph search request comprises constraints that each path of the set of result paths must satisfy;

the instructions further cause evaluating the constraints during the first pass.

43. The one or more non-transitory computer readable media of claim 24 wherein:

the graph search request comprises constraints that each path of the set of result paths must satisfy;

the instructions do not cause evaluating the constraints during the second pass.

44. The one or more non-transitory computer readable media of claim 24 wherein the first pass does not depend on the one or more target vertices.

\* \* \* \* \*

UNITED STATES PATENT AND TRADEMARK OFFICE
CERTIFICATE OF CORRECTION

PATENT NO. : 10,810,257 B2
APPLICATION NO. : 14/837696
DATED : October 20, 2020
INVENTOR(S) : Van Rest et al.

It is certified that error appears in the above-identified patent and that said Letters Patent is hereby corrected as shown below:

On page 2, Column 1, under Other Publications, Line 4, delete "Shorest" and insert -- Shortest --, therefor.

On page 2, Column 1, under Other Publications, Line 9, delete "Grpah" and insert -- Graph --, therefor.

On page 2, Column 2, under Other Publications, Line 11, delete "Efficeient" and insert -- Efficient --, therefor.

On page 2, Column 2, under Other Publications, Line 37, delete "Comparision"," and insert -- Comparison", --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*